United States Patent [19]

Strunk

[11] 4,019,599
[45] Apr. 26, 1977

[54] SPRING TYPE PIPE SUPPORT
[75] Inventor: Larry E. Strunk, Jackson, Mich.
[73] Assignee: Tenneco Inc., Racine, Wis.
[22] Filed: Sept. 27, 1973
[21] Appl. No.: 401,507
[52] U.S. Cl. .......................... 180/64 A; 248/54 R; 248/62; 248/74 A
[51] Int. Cl.² ...................................... F16L 3/02
[58] Field of Search ................ 248/54 R, 62, 74 A, 248/316 B, 316 D, 230, 229, 317, 302, 315, 72, 226 C, 221 F, 58; 24/255 C, 261 AC, 254, 257 R, 3 D, 27, 81 C, 131 R, 261 A; 180/64 A; 294/118, 86 H; D54/13 R, 13 A

[56] References Cited

UNITED STATES PATENTS

| | | | |
|---|---|---|---|
| 447,297 | 3/1891 | Carpenter | 248/62 X |
| 967,564 | 8/1910 | Robinson | 248/61 |
| 1,129,782 | 2/1915 | Bissell et al. | 248/54 R X |
| 1,262,763 | 4/1918 | Farley | 248/62 |
| 1,707,557 | 4/1929 | Leap | 248/230 X |
| 2,160,808 | 6/1939 | Bradley | 248/54 R X |
| 2,227,306 | 12/1940 | Guy | 248/54 R |
| 2,308,969 | 1/1943 | Riesing | 248/54 R |
| 2,378,660 | 6/1945 | Roux | 248/229 X |
| 2,557,532 | 6/1951 | Chaft | 248/229 |
| 2,636,703 | 4/1953 | Wallans | 248/54 R X |
| 2,842,218 | 7/1958 | Bradbury | 248/54 R X |
| 3,888,439 | 6/1975 | Tuttle | 248/54 R |

FOREIGN PATENTS OR APPLICATIONS

| | | | |
|---|---|---|---|
| 490,789 | 5/1919 | France | 248/317 |
| 946,773 | 8/1956 | Germany | 180/64 A |
| 42,912 | 11/1965 | Germany | 248/62 |
| 949,372 | 9/1956 | Germany | 248/316 D |
| 10,055 | 3/1905 | United Kingdom | 248/74 A |

Primary Examiner—Roy D. Frazier
Assistant Examiner—Rodney H. Bonck
Attorney, Agent, or Firm—Harness, Dickey & Pierce

[57] ABSTRACT

A pipe support to fit different size conduits and suitable for automotive exhaust systems includes a snap-in clamp formed of a single piece of spring wire to have offset resilient jaws of elliptical shape that spread apart upon insertion of the conduit and then snap in place through their own inherent resiliency to hold the conduit in the desired suspended position and a helical coil that is fitted on a rubber support grommet.

9 Claims, 4 Drawing Figures

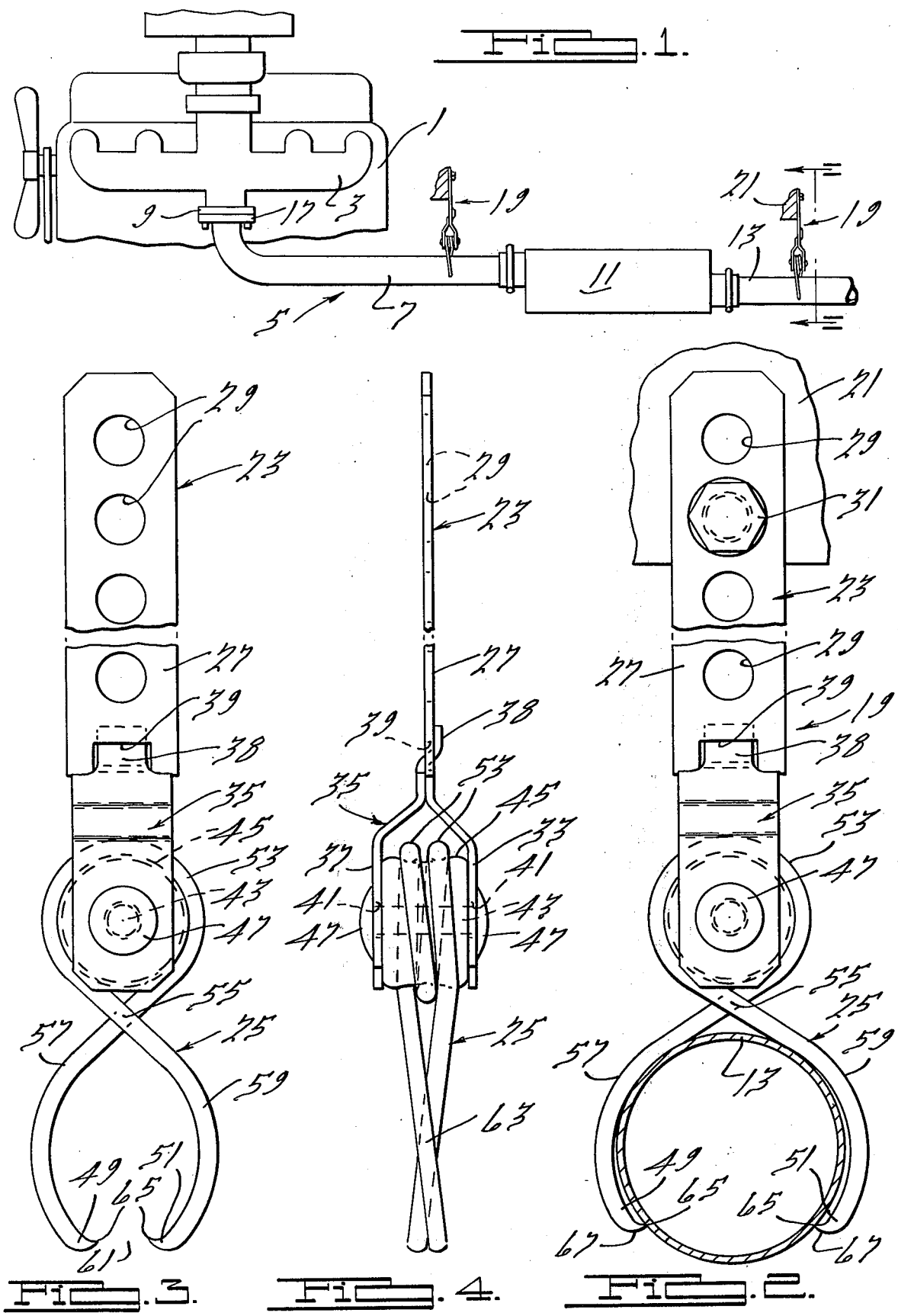

SPRING TYPE PIPE SUPPORT

RELATED APPLICATION

This application covers portions of the structure shown in copending U.S. application Ser. No. 398,540, filed Sept. 17, 1973 of Franklin R. Hubbell, III, now U.S. Pat. No. 3,960,232, and assigned to the assignee hereof.

BRIEF SUMMARY OF THE INVENTION

It is the purpose of this invention to provide an improved snap-in spring type pipe support of a design that may be used in automotive exhaust systems and which provides quick and easy assembly and disassembly and which is relatively inexpensive to manufacture.

In a preferred form the support includes a pipe clamp with resilient spread-apart jaws of elliptical shape, the jaws preferably being offset and crisscrossed to improve their holding power.

DESCRIPTION OF THE DRAWINGS

FIG. 1 is a schematic side elevation of an automotive internal combustion engine with an exhaust system that is suspended by means embodying the present invention;

FIG. 2 is an enlarged front elevation of the hanger used in the system of FIG. 1 as taken along the line 2—2 of FIG. 1;

FIG. 3 is a detail side elevation of the hanger as shown in FIG. 2 but with the pipe removed; and FIG. 4 is a side elevation of the hanger shown in FIG. 3.

DETAILED DESCRIPTION OF THE INVENTION

An automobile or other motor vehicle has an internal combustion engine 1 with an exhaust manifold 3 that discharges exhaust gases into an exhaust line or system 5 that may include an exhaust pipe 7 which is connected at its inlet end to the outlet 9 of the manifold 3. The exhaust pipe 7 conducts gases to an exhaust gas silencing muffler 11 which in turn discharges exhaust gases into a tailpipe 13 through which the gases flow for discharge into the atmosphere. The front part of the exhaust line or system 5 is supported by means of the usual attachment pad 17 that is bolted to the manifold outlet flange to hold the inlet of the exhaust pipe 7 in position. Mounting or support means 19 are used to support various points of the exhaust line 5 downstream from the mounting pad 17 on the chassis or frame 21 of the vehicle.

FIGS. 2-4 illustrate the support means 19 which comprises a bracket or strap member 23 and a spring wire clamp member 25. The strap 23 has a main section 27 which is solid metal and has a plurality of openings 29 along its length to provide a plurality of points at which it can be attached by a bolt 31 to the frame 21 or other support. The bottom of the strap section 27 is offset as seen at 33 to cooperate with a second strap section 35 which is offset in the opposite direction as seen at 37. The upper end of section 35 is reduced in width and offset to provide a tongue 38 that extends through a slot 39 in the section 27 so that section 35 fits flat against and is supported in position by opposite sides of section 27. In the supported position the offset portions 33 and 37 have aligned holes 41 through which a rivet or post 43 extends. An annular vibration and noise insulating rubber sleeve or grommet 45 fits on the rivet 43 and is clamped between the two portions 33 and 37 by the rivet heads 47 that bear against the outside faces of the portions 33 and 37. The various parts are sized and shaped to provide a sturdy, solid assembly at the bottom of the support member 23. Vertical loads on the grommet 45 and rivet 43 are transmitted into the upper portion of strap section 27 via the two offset portions 33 and 37.

The clamp member 25 comprises a single piece of spring wire that has two spaced ends 49 and 51. The central section of the wire is in the form of two helical loops 53 that fit on the grommet 45 as seen best in FIG. 4 to form a holding section for the clamp. The end sections of the wire extending between the loops and the ends 49 and 51 criss cross at 55 (FIGS. 2 and 3) and are shaped to provide tong arms or jaw sections 57 and 59. In front elevation the clamp has a FIG. 8 shape with a first section that is the holding section and a second section which is open on the bottom between ends 49 and 51 to provide a tube receiving mouth 61. As seen in FIG. 3, the jaw sections 57 and 59 have an elliptical shape to enable them to fit and grip a variety of pipe sizes without rattling. Further, the jaws are inclined in opposite directions with respect to an imaginary midplane perpendicular to the axis of the post 43 or of the jaws or of a conduit held by the jaws and intersect and extend to opposite sides of such midplane, i.e., the jaws are convergent and criss crossed at 63 by means of opposite axial offsets in the direction of the axis or of post 43. This offset arrangement serves as a means to prevent twisting of the clamp off of a pipe and thereby increases the holding power of the clamp.

As seen in FIGS. 2 and 3, the ends 49 and 51 are shaped to have barbs 65 at their inner sides which act as ratchet teeth to prevent camming out of a pipe. The end faces of the wire form a taper and the corners are rounded at 67 to provide a chamfered, tapered, funnel mouth effect that makes it as easy as possible for the pipe 13 to expand the jaws upon insertion so that it can pass through the mouth 61.

When the jaw sections 57 and 59 are spread apart as seen in FIG. 2, they contact the pipe at the barbs and at points of tangency, due to their elliptical shape, thereby minimizing heat transference. Spreading of the jaws tends to raise criss cross point 55 and reduce the diameter of spring coils 53 so that they are tightly compressed around rubber grommet 45 to lock the clamp in position. The energy stored in the coils holds the barbs 65 in place, i.e., resists expansion of mouth 61, so that a down load on the pipe tends to straighten the jaws 57 and 59 and their resistance to this also holds the pipe inside the clamp. As already indicated, the elliptical shape of the jaws enables the foregoing action to take place with a rather wide range of pipe sizes.

Modifications in the specific structure illustrated may be made without departing from the spirit and scope of the invention. It is also apparent that the exhaust system can be vertically disposed, as in some truck or bus installations, and that the hanger means may be used for installations and applications other than exhaust systems.

I claim:

1. A spring type support for a pipe or the like comprising a support post having an axis, a resilient outer layer on the post and coaxial therewith, a spring clamp formed from a single piece of spring wire and shaped to a substantially figure eight configuration consisting essentially of only a first section and a second section, said first section comprising a holding section and being entirely closed and mounted on and around said resilient layer, said second section comprising a pipe clamping section and being open on the portion opposite to the first section to form a pair of resilient jaws and a mouth for the insertion and removal of a pipe, spreading of said jaws causing a reduction in diameter of said first section and compression by said first section of said resilient layer, said jaws being offset in opposite directions with respect to a midplane of the clamp normal to said post axis and intersecting such midplane and extending to opposite sides thereof whereby said jaws crisscross across said midplane and the ends of said jaws will respectively engage opposite sides of a pipe at two points that are separated along the length of the pipe and on opposite sides of said midplane, said crisscross arrangement of said jaws providing means to resist twisting of the clamp off a pipe.

2. A support as set forth in claim 1 wherein said first section is substantially circular and said second section is substantially elliptical in shape.

3. A spring type support for a pipe or the like comprising a support post having an axis, a spring clamp formed of a single piece of spring wire and shaped to a substantially figure eight configuration consisting essentially of only a first section and a second section, said first section comprising a holding section and being mounted on said post, said second section comprising a pipe clamping section and being open on the portion opposite to the first section to form a pair of resilient jaws and a mouth for the insertion and removal of a pipe, said jaws being offset in opposite directions along the post axis with respect to a plane normal to said post axis and intersecting such plane and extending to opposite sides thereof whereby said jaws crisscross each other across said plane and will respectively engage a pipe at points that are axially separated along the length of the pipe to provide means to resist twisting of the clamp off a pipe.

4. A support as set forth in claim 3 wherein said first section is substantially circular and spreading of said jaws causes a reduction in diameter thereof and said second section is substantially elliptical in shape whereby said jaws are adapted to received and grip a plurality of different size pipes.

5. A spring type support for a pipe or the like comprising a support post having an axis extending substantially parallel to the axis of a pipe to be supported, a spring clamp formed of a single piece of spring wire and shaped to a substantially figure eight configuration consisting essentially of only a first section and a second section, said first section comprising a substantially annular holding section and being mounted on and substantially coaxial with said post, said second section comprising a pipe clamping section and being open on the portion opposite to the first section to form a pair of resilient jaws defining a mouth for the insertion and removal of a pipe, said jaws being offset in opposite directions along the length of the post axis with respect to a midplane of the clamp that is normal to said post axis, said jaws converging toward each other when viewed from a position parallel to said post so that the line of sight is perpendicular to the axis of said post and each said jaws intersecting such midplane and the convergence of said jaws providing increased resistance to twisting of the clamp off a pipe as compared to offset jaws that are parallel to each other.

6. In combination, a clamp member for snap-in gripping of a conduit or the like and support means including a post to support the clamp member, said post having an axis, said clamp member comprising a piece of spring steel wire shaped to a substantially figure eight configuration consisting essentially of only a first section and a second section, said second section consisting essentially of only a pair of resilient jaw sections defining a resilient mouth for insertion and removal of the conduit, said jaws together defining an elliptical shape, said first section consisting essentially of only closed circular holding means connected to the jaws and having an aperture fitting around said post to secure the clamp member to the support means, said jaw sections converging toward each other and crisscrossing each other when viewed from a position parallel to said post axis so that the line of sight is perpendicular to the axis of said post to provide means to resist twisting off of the clamp member from a cnduit.

7. In an exhaust system for motor vehicles having a support structure and an internal combustion engine discharging exhaust gases into the system, said system including an exhaust gas conducting conduit connected to the engine, mounting means including a hanger supporting the system on the support structure, said mounting means including at least one snap-in conduit clamp member supported on the hanger and formed of spring wire, said clamp member having a pair of laterally resilient jaws adapted to fit around a major portion but less than all of the periphery of said conduit and resiliently hold the conduit between the jaws, said jaws having ends spaced apart by less than the width of the conduit to define an expandable resilient mouth for insertion and removal of the conduit, said jaws being offset in opposite directions along the length of a conduit held by the clamp member with respect to a midplane of said clamp member normal to said conduit and intersecting such midplane and extending to opposite sides thereof so that the ends of the jaws gripping the conduit are axially separated from each other to provide means to resist twisting off of the clamp member from a conduit.

8. In an exhaust system for motor vehicles having a support structure and an internal combustion engine discharging exhaust gases into the system, said system including a silencing member and at least one exhaust gas conducting conduit connected to the silencing member, mounting means supporting the system on the engine and support structure at a plurality of points spaced apart lengthwise of the system, said mounting means including a post element and at least one conduit snap-in clamp member attached to the post element and having a pair of laterally resilient jaws shaped to fit around a major portion but less than all of the periphery of said conduit and resiliently hold the conduit between the jaws, said jaws having ends spaced apart by less than the width of the conduit to define an expandable resilient mouth for insertion and removal of the conduit, said clamp member being formed of a single piece spring steel wire so that the jaws are inherently resilient, an annular rubber layer on the outside of said post, said wire being shaped to have a holding section fitting around said rubber layer and said jaws extending from said holding section, said holding section comprising loop means formed in the wire and the wire crisscrossing at one side of the loop means to form said jaws so that said clamp member is of a substantially figure eight configuration and expansion of the jaws tightens the loop means on said rubber layer, said jaws being offset in opposite directions along the length of the conduit with respect to an imaginary plane normal to the axis of the conduit and through the clamp member and intersecting such plane and extending respectively beyond opposite sides thereof whereby said jaws crisscross each other across said plane and the ends of said jaws respectively engage said conduit at points on opposite sides of said plane to provide means to resist twisting off of the clamp member with respect to the pipe.

9. In a conduit hanger assembly for automotive exhaust system conduits and the like including elongated fastening means adapted adjacent one end to be secured to a support structure, a post member, connecting means securing said post member to the other end of said fastening means, and a spring hanger comprising a torsion spring having a coil body defining a coil axis and arms which are integral extensions of the opposite ends of the coil ends which form spaced apart tong arms between which an exhaust system conduit can be inserted to expand and be gripped by the tong arms, the coil body of said hanger being positioned about the periphery of said post member and sized so that expansion of the tong arms to grip a said conduit reduces the diameter of the coil body so that it radially grips the post member, the improvement comprising said tong arms extending around a major portion but less than all of the periphery of said conduit and being offset in opposite directions along the length of said axis with respect to an imaginary plane extending normal to said coil axis and through the coil body and intersecting such plane and extending respectively beyond opposite sides thereof whereby said tong arms crisscross each other across said plane and the ends thereof will respectively engage said conduit at points on opposite sides of said plane to provide means to resist twist off of the hanger with respect to the conduit.

* * * * *